US009624786B2

(12) United States Patent
Xu et al.

(10) Patent No.: US 9,624,786 B2
(45) Date of Patent: Apr. 18, 2017

(54) BRAZE MATERIALS AND METHOD FOR JOINING OF CERAMIC MATRIX COMPOSITES

(71) Applicants: Rolls-Royce North American Technologies, Inc., Indianapolis, IN (US); Rolls-Royce Corporation, Indianapolis, IN (US)

(72) Inventors: Raymond R. Xu, Carmel, IN (US); Ted J. Freeman, Danville, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 506 days.

(21) Appl. No.: 14/103,927

(22) Filed: Dec. 12, 2013

(65) Prior Publication Data

US 2016/0102576 A1    Apr. 14, 2016

Related U.S. Application Data

(60) Provisional application No. 61/794,538, filed on Mar. 15, 2013.

(51) Int. Cl.
*B23K 1/00* (2006.01)
*C22C 1/04* (2006.01)
(Continued)

(52) U.S. Cl.
CPC .......... *F01D 25/005* (2013.01); *B23K 1/0006* (2013.01); *B23K 1/0018* (2013.01);
(Continued)

(58) Field of Classification Search
CPC ....... C22C 1/045; C22C 1/0458; C22C 14/00; C22F 1/18; C22F 1/183; C04B 37/026;
(Continued)

(56) References Cited

U.S. PATENT DOCUMENTS 3,813,759 A    6/1974  Heap et al.
4,499,360 A    2/1985  Rottenbacher
(Continued)

FOREIGN PATENT DOCUMENTS

WO    2013089869 A2    6/2013

OTHER PUBLICATIONS

International Search Report for PCT International Application Serial No. PCT/US2013/074572, completed Jul. 9, 2014, (18 pages).

(Continued)

*Primary Examiner* — Helene Klemanski
(74) *Attorney, Agent, or Firm* — Brinks Gilson & Lione

(57) ABSTRACT

A method of coupling two ceramic matrix composite components comprises procuring a first ceramic matrix composite component, procuring a second ceramic matrix composite component, and applying a melt alloy between the first and second ceramic matrix components. The melt alloy comprises a homogeneous mixture of two or more materials in powder form, where the two or more materials include a braze alloy comprising silicon and a high melting point material or alloy. The first and second ceramic matrix composite components and the melt alloy are heat treated to a temperature, and the temperature is maintained for a length of time, followed by cooling, thereby coupling the first and second ceramic matrix composite components.

17 Claims, 3 Drawing Sheets

(51) Int. Cl.
| | | |
|---|---|---|
| C22C 14/00 | (2006.01) | |
| C22F 1/18 | (2006.01) | |
| C04B 37/02 | (2006.01) | |
| B22F 5/04 | (2006.01) | |
| F01D 25/00 | (2006.01) | |
| B23K 35/24 | (2006.01) | |
| C04B 35/71 | (2006.01) | |
| C04B 37/00 | (2006.01) | |
| B23K 35/30 | (2006.01) | |
| B23K 35/32 | (2006.01) | |
| B23K 35/02 | (2006.01) | |
| B23K 1/19 | (2006.01) | |
| C22C 28/00 | (2006.01) | |
| F01D 9/02 | (2006.01) | |
| F01D 5/28 | (2006.01) | |
| B23K 103/00 | (2006.01) | |

(52) U.S. Cl.
CPC ............ *B23K 1/19* (2013.01); *B23K 35/0222* (2013.01); *B23K 35/0238* (2013.01); *B23K 35/0244* (2013.01); *B23K 35/24* (2013.01); *B23K 35/30* (2013.01); *B23K 35/32* (2013.01); *B23K 35/325* (2013.01); *C04B 35/71* (2013.01); *C04B 37/006* (2013.01); *C22C 14/00* (2013.01); *C22C 28/00* (2013.01); *F01D 5/282* (2013.01); *F01D 9/02* (2013.01); *B23K 2203/52* (2015.10); *C04B 2237/12* (2013.01); *C04B 2237/121* (2013.01); *C04B 2237/122* (2013.01); *C04B 2237/365* (2013.01); *C04B 2237/38* (2013.01); *C04B 2237/80* (2013.01); *C04B 2237/84* (2013.01); *C22C 1/04* (2013.01); *C22C 1/045* (2013.01); *C22C 1/0458* (2013.01); *F05D 2230/237* (2013.01); *F05D 2240/80* (2013.01); *F05D 2300/18* (2013.01); *F05D 2300/6033* (2013.01)

(58) Field of Classification Search
CPC .. C04B 2237/122; B22F 5/04; B22F 2998/10; B23K 1/0018
USPC ................. 75/245, 247; 420/418, 421, 578; 415/200; 228/121
See application file for complete search history.

(56) References Cited

U.S. PATENT DOCUMENTS

| | | | |
|---|---|---|---|
| 4,711,971 A | 12/1987 | Duncan et al. | |
| 4,784,313 A | 11/1988 | Godziemba | |
| 4,830,820 A | 5/1989 | Itoh et al. | |
| 4,851,299 A | 7/1989 | Godziemba-Maliszewski | |
| 4,961,529 A | 10/1990 | Gottselig et al. | |
| 5,203,488 A * | 4/1993 | Wang .................... | C04B 37/026 228/127 |
| 5,447,683 A | 9/1995 | Montgomery et al. | |
| 5,705,280 A * | 1/1998 | Doty ........................ | B22F 3/23 428/539.5 |
| 5,732,468 A | 3/1998 | Galley et al. | |
| 5,836,505 A | 11/1998 | Chaumat et al. | |
| 5,975,407 A | 11/1999 | Gasse et al. | |
| 6,221,499 B1 | 4/2001 | Gasse et al. | |
| 6,397,581 B1 | 6/2002 | Vidal et al. | |
| 6,692,586 B2 * | 2/2004 | Xu .......................... | C22C 14/00 420/421 |
| 6,884,030 B2 | 4/2005 | Darkins et al. | |
| 7,115,319 B2 | 10/2006 | Raybould et al. | |
| 7,222,775 B2 | 5/2007 | Chaumat et al. | |
| 7,318,547 B2 | 1/2008 | Gasse | |
| 7,360,988 B2 | 4/2008 | Lee et al. | |
| 7,478,742 B2 | 1/2009 | Beyer et al. | |
| 7,748,956 B2 | 7/2010 | Paulino et al. | |
| 7,794,201 B2 | 9/2010 | Burton et al. | |
| 7,874,059 B2 | 1/2011 | Morrison et al. | |
| 8,047,771 B2 | 11/2011 | Tucker et al. | |
| 9,056,369 B2 * | 6/2015 | Chaumat ............... | B23K 1/0008 |
| 2004/0120813 A1 | 6/2004 | Couture et al. | |
| 2007/0084051 A1 | 4/2007 | Tomoko et al. | |
| 2008/0087710 A1 | 4/2008 | Glaeser | |
| 2008/0190552 A1 | 8/2008 | Bouillon et al. | |
| 2009/0266870 A1 | 10/2009 | Yousefiani et al. | |
| 2010/0126018 A1 | 5/2010 | Headley et al. | |
| 2012/0177488 A1 | 7/2012 | Corman | |
| 2013/0075039 A1 | 3/2013 | Herderick et al. | |
| 2014/0271144 A1* | 9/2014 | Landwehr ............... | F01D 11/08 415/173.1 |

OTHER PUBLICATIONS

Invitation to Pay Additional Fees and, Where Applicable, Protest Fee for PCT International Application Serial No. PCT/US2013/074572, dated Apr. 4, 2014, (5 pages).

* cited by examiner

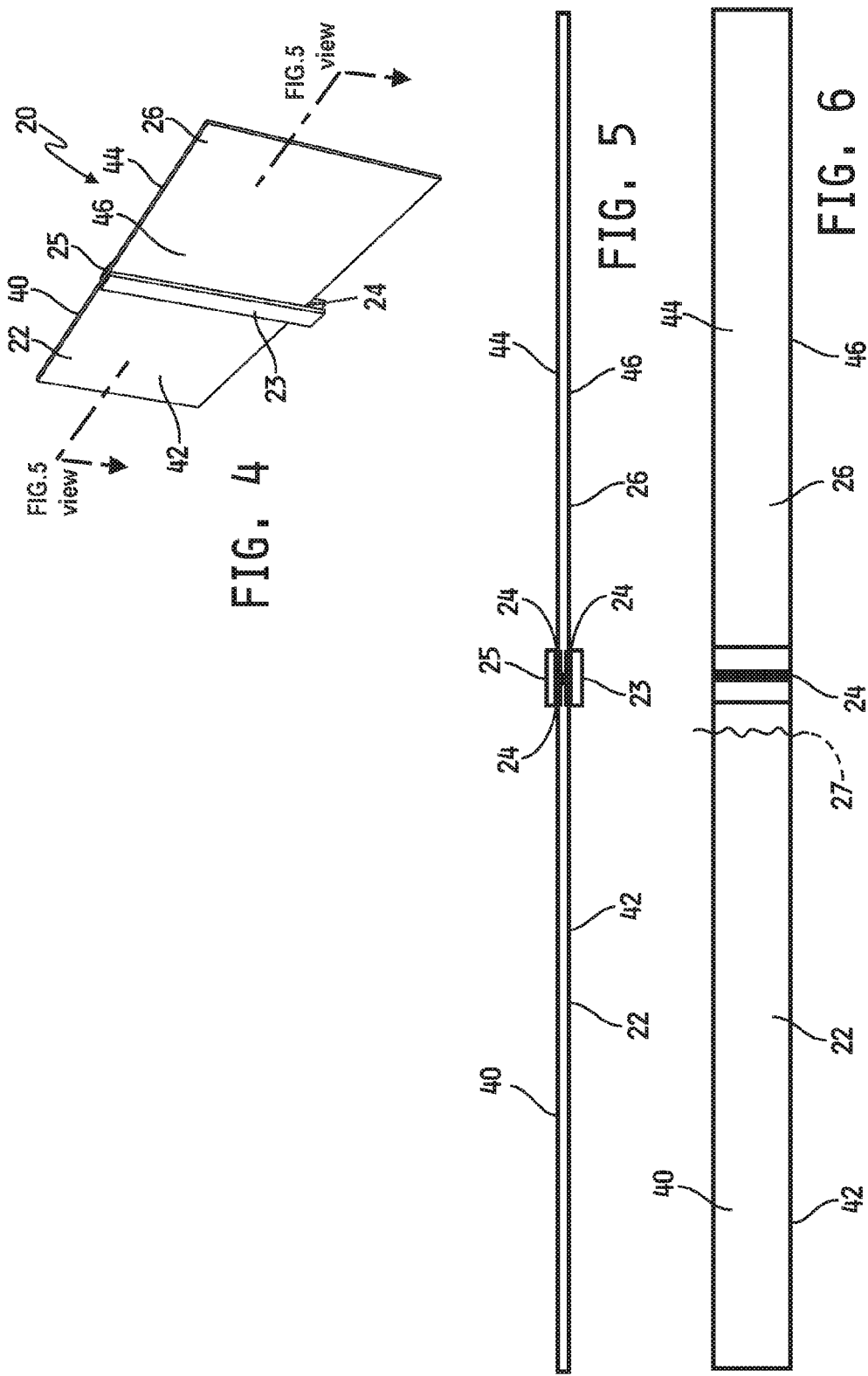

BRAZE MATERIALS AND METHOD FOR JOINING OF CERAMIC MATRIX COMPOSITES

CROSS-REFERENCE TO RELATED APPLICATION

This application claims the benefit of and priority to U.S. Provisional Patent Application Ser. No. 61/794,538, filed Mar. 15, 2013, which is expressly incorporated herein by reference.

FIELD OF THE DISCLOSURE

The present disclosure relates generally to a melt alloy for joining two components, and more specifically to a melt alloy for joining components included in a gas turbine engine.

BACKGROUND

Ceramic Matrix Composite (CMC) materials may be used in aerospace engine applications because of their mechanical properties and chemical stability at high temperature. Turbine bladetrack, vanes, and blades of gas turbine engines may be manufactured from CMC materials.

Coupling together two or more components made of CMC material may be difficult for a number of reasons. One reason coupling is difficult is that coupling alloys including nickel and/or gold may exhibit melting temperatures below about 1200° C. As a result, joints brazed with nickel and/or gold alloys have very low or no mechanical strength and oxidation resistance at temperatures above about 1250° C. Another reason coupling may be difficult is that nickel and/or gold-based braze alloys may have a tendency to form low melting eutectic phases in braze joints and the areas adjacent the braze joints due to CMCs often containing some free silicon. The eutectic phases develop from braze alloy interaction. For example, the gold-based braze alloy may be problematic as it would form a low temperature eutectic phase, for example, gold-silicon eutectic phase, that has a melting temperature of about 360° C. The resulting braze joint and surrounding areas may then be susceptible to failure and oxidation at high temperatures. As a result, such braze joints may not be suitable in high temperature sections of gas turbine engines.

In addition, CMC materials may be brittle and have much lower Coefficients of Thermal Expansion (CTE) than those of most conventional braze filler metals. The high temperature brazing process could produce significant thermal residual stresses in the braze joints. The thermal residual stresses can cause, for example, CMC or joint cracking during the cooling cycle or in service.

SUMMARY

The present disclosure may comprise one or more of the following features and combinations thereof.

A gas turbine engine vane assembly may include an airfoil, a first platform, a second platform, and a melt alloy. The airfoil may be made of a ceramic matrix composite material. The first platform may be made of a ceramic matrix composite material and located at a first end of the airfoil. The second platform may be made of a ceramic matrix composite material and located at a second end of the airfoil. The melt alloy layer may interconnect the first and second platforms to the airfoil.

In some embodiments, the melt alloy layer may include a base element and at least one secondary element. The base element may be selected from the group consisting of titanium, tantalum, niobium, hafnium, silicon, and germanium. The at least one secondary element may be different from the base element. The secondary element may be selected from the group consisting of chromium, aluminum, niobium, boron, silicon, germanium, and mixtures thereof.

In some embodiments, the melt alloy layer may have a melting point of about 1300° C. to 1650° C. In some embodiments, the melt alloy layer may be a crystalline solid.

In some embodiments, the melt alloy layer may have a nominal composition including up to about 75 percent by weight silicon. In some embodiments, the melt alloy layer may have a nominal composition including up to about 25 percent by weight aluminum.

In some embodiments, the melt alloy layer may have a nominal composition including up to about 91 percent by weight titanium. In some embodiments, the melt alloy layer may have a composition including silicon, titanium, and an element selected from the group consisting of carbon, boron, tantalum, niobium, and hafnium.

In some embodiments, the melt alloy layer may be a eutectic mixture. In some embodiments, the melt alloy layer may have a eutectic melting temperature of about 1330° C.

In some embodiments, the melt alloy layer may include a base metal. In some embodiments, the melt alloy layer may include at least one secondary metal that may be different than the base metal.

In some embodiments, the melt alloy layer may include at least one secondary element that may be different than the base metal. In some embodiments, the melt alloy layer may include a base intermetallic element.

In some embodiments, the melt alloy layer may include at least one secondary metal that may be different than the base intermetallic element. In some embodiments, the melt alloy layer may include at least one secondary element that may be different than the base intermetallic element.

According to another aspect of the present disclosure, a gas turbine engine may include a first gas engine component, a second gas engine component, and a melt alloy. The first gas turbine engine component may be made of a ceramic matrix composite material. The second gas turbine engine component may be made of a ceramic matrix composite material. The melt alloy layer may interconnect the first and second gas turbine engine components.

In some embodiments, the melt alloy layer may include a base element and at least one secondary element. The base element may be selected from the group consisting of titanium, tantalum, niobium, hafnium, silicon, and germanium. The at least one secondary element may be different from the base element. The secondary element may be selected from the group consisting of chromium, aluminum, niobium, boron, silicon, germanium, and mixtures thereof.

In some embodiments, the melt alloy layer may have a melting point of about 1300° C. to 1650° C. In some embodiments, the melt alloy layer may be a crystalline solid.

In some embodiments, the melt alloy layer may have a nominal composition including up to about 75 percent by weight silicon. In some embodiments, the melt alloy layer may have a nominal composition including up to about 25 percent by weight aluminum.

In some embodiments, the melt alloy layer may have a nominal composition including up to about 91 percent by weight titanium. In some embodiments, the melt alloy layer may have a composition including silicon, titanium and, an element selected from the group consisting of carbon, boron, tantalum, niobium, and hafnium.

In some embodiments, the melt alloy layer may have a eutectic mixture. In some embodiments, the melt alloy layer may have a eutectic melting temperature of about 1330° C.

In some embodiments, the melt alloy layer may include a base metal. In some embodiments, the melt alloy layer may include at least one secondary metal that may be different than the base metal.

In some embodiments, the melt alloy layer may include at least one secondary element that may be different than the base metal. In some embodiments, the melt alloy layer may include a base intermetallic element.

In some embodiments, the melt alloy layer may include at least one secondary metal that may be different than the base intermetallic element. In some embodiments, the melt alloy layer may include at least one secondary element that may be different than the base intermetallic element.

According to another aspect of the present disclosure, a melt alloy may include a base element and at least one secondary element. The base element may be selected from the group consisting of titanium, tantalum, niobium, hafnium, silicon, and germanium. The at least one secondary element may be different from the base element. The secondary element may be selected from the group consisting of chromium, aluminum, niobium, boron, silicon, germanium, and mixtures thereof.

In some embodiments, the melt alloy layer may have a melting point of about 1300° C. to 1650° C. In some embodiments, the melt alloy layer may be a crystalline solid.

In some embodiments, the melt alloy layer may have a nominal composition including up to about 75 percent by weight silicon. In some embodiments, the melt alloy layer may have a nominal composition including up to about 25 percent by weight aluminum.

In some embodiments, the melt alloy layer may have a nominal composition including up to about 91 percent by weight titanium. In some embodiments, the melt alloy layer may have a composition including silicon, titanium and, an element selected from the group consisting of carbon, boron, tantalum, niobium, and hafnium.

In some embodiments, the melt alloy layer may be a eutectic mixture. In some embodiments, the melt alloy layer may have a eutectic melting temperature of about 1330° C.

In some embodiments, the melt alloy layer may include a base metal. In some embodiments, the melt alloy layer may include at least one secondary metal that may be different than the base metal.

In some embodiments, the melt alloy layer may include at least one secondary element that may be different than the base metal. In some embodiments, the melt alloy layer may include a base intermetallic element.

In some embodiments, the melt alloy layer may include at least one secondary metal that may be different than the base intermetallic element. In some embodiments, the melt alloy layer may include at least one secondary element that may be different than the base intermetallic element.

According to another aspect of the present disclosure, a method of coupling two ceramic matrix composite components may include the operations of providing a first ceramic matrix composite component, providing a second ceramic matrix composite component, applying a melt alloy between the first and second ceramic matrix components, heat treating the first ceramic matrix composite component, the second ceramic matrix composite component, and the melt alloy to a temperature, maintaining the temperature for a length of time, and cooling the first ceramic matrix composite component, the second ceramic matrix composite component, and the melt alloy.

In some embodiments, the melt alloy may include a base element and a secondary element different from the base element. The base element may be selected from the group consisting of titanium, tantalum, niobium, hafnium, silicon, and germanium. The secondary element may be selected from the group consisting of chromium, aluminum, niobium, boron, silicon, germanium, and mixtures thereof.

In some embodiments, the temperature may be about 2475° F. In some embodiments, a portion of the melt alloy may have a melting point at or below about 2475° F.

In some embodiments, the method may further include the operation of melting the melt alloy during the operation of maintaining the temperature. In some embodiments, the temperature may be at least about 2400° F. yet lower than a melting point temperature of the ceramic matrix composite components.

In some embodiments, the temperature may be a temperature suitable for diffusion. In some embodiments, the temperature may be about 2000° F. to 2400° F.

In some embodiments, the first component, the second component, and the melt alloy layer may form a single lap joint. In some embodiments, the first component, the second component, and the melt alloy layer may form a double lap joint.

These and other features of the present disclosure will become more apparent from the following description of the illustrative embodiments.

BRIEF DESCRIPTION OF THE DRAWINGS

FIG. 4 is a perspective view of a first test assembly used to test the melt alloy, the first test assembly including a first component made of ceramic matrix composite material joined to a second component made of ceramic matrix composite material by the melt alloy and a strip of ceramic matrix composite material reinforcing both sides of the joint;

FIG. 5 is a side elevation view of the first test assembly of FIG. 4;

FIG. 6 is a plan view of a second test assembly used to test the melt alloy, the second test assembly including a first component made of ceramic matrix composite material joined to a second component made of ceramic matrix composite material by the melt alloy and a strip of ceramic matrix composite material reinforcing both sides of the joint;

DETAILED DESCRIPTION OF THE DRAWINGS

Figure 1:
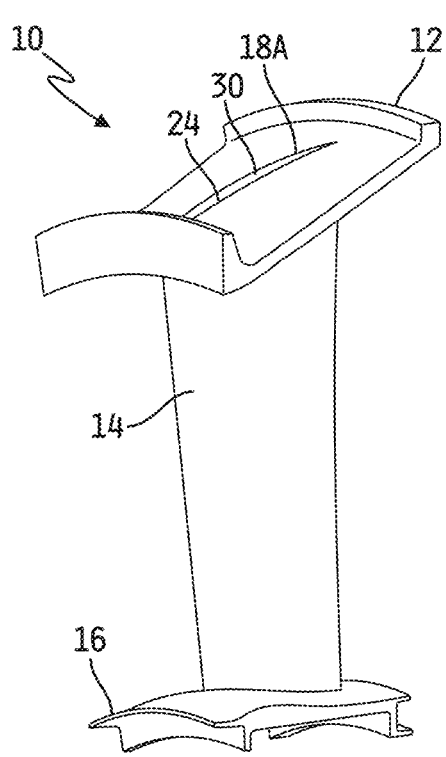
FIG. 1 is a perspective view of a gas turbine engine vane assembly made of ceramic matrix composite material, the vane assembly joined by a melt alloy.
Figure 2:
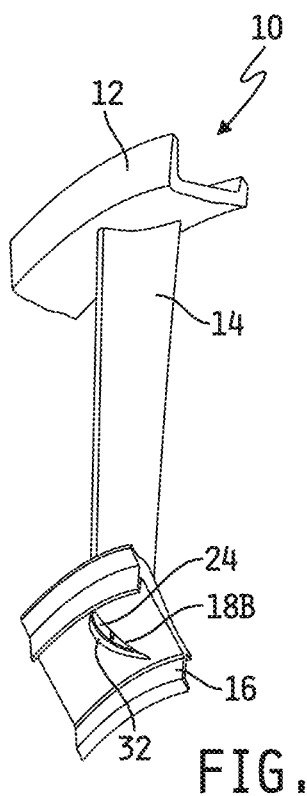
FIG. 2 is another perspective view of the gas turbine engine vane assembly of FIG. 1.
Figure 3:
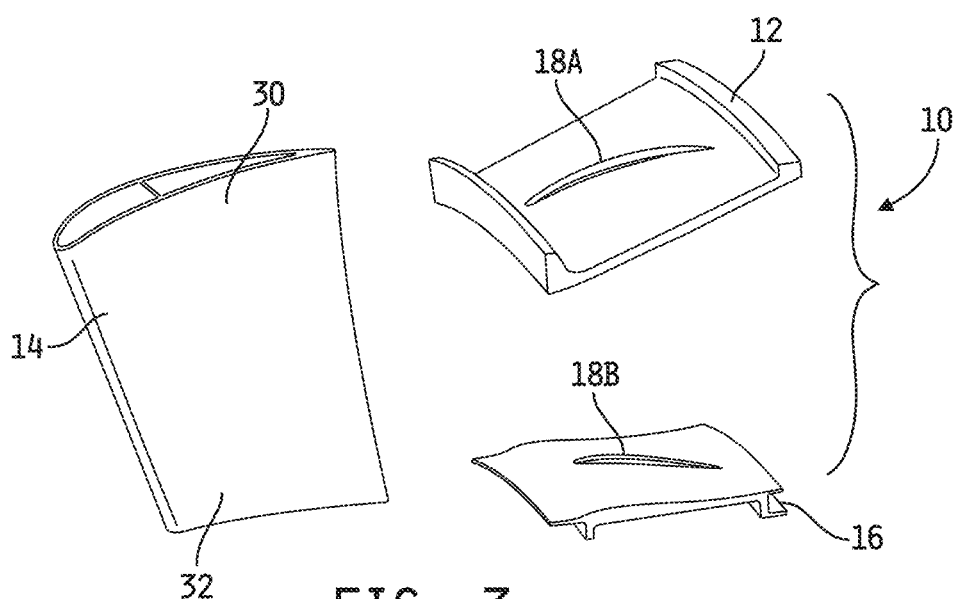
FIG. 3 is an exploded assembly view of the vane assembly of FIG. 1 showing that the vane assembly includes an airfoil made of a ceramic matrix composite material, a first platform made of ceramic matrix composite material, and a second platform made of ceramic matrix composite material.

For the purposes of promoting an understanding of the principles of the disclosure, reference will now be made to a number of illustrative embodiments illustrated in the drawings and specific language will be used to describe the same.

A melt alloy 24 and a method of using the melt alloy 24 for brazing high temperature substrates including, for example, SiC fiber reinforced ceramic matrix composites is disclosed. In some embodiments, melt alloy 24 joins a ceramic matrix composite component to another ceramic matrix composite component. In some embodiments, melt alloy 24 joins a ceramic matrix composite component to a metal. In some embodiments, the melt alloy 24 includes at least one filler alloy, as shown, for example, in Table 1 below.

The melt alloy 24 includes a base element and at least one secondary element that is different than the base element. The base element is selected from a group consisting of silicon, titanium, chromium, cobalt, niobium, hafnium, tantalum and germanium. The at least one secondary element is selected from a group consisting of chromium, aluminum, titanium, niobium, boron, silicon, and germanium. In some embodiments, melt alloy 24 includes a tertiary element. In some embodiments, the tertiary element is selected from a group consisting of carbon, boron, tantalum, niobium, and hafnium.

In some embodiments, at least one lower melting point alloy or other material is included in melt alloy 24. In some embodiments, at least one higher melting point alloy or other material is included in melt alloy 24, for example, carbon, boron or TiH, as shown in Table 2. In some embodiments, melt alloy 24 is a homogeneous mixture of the two or more alloys combined in powder form.

In one example, a melt alloy includes silicon-titanium (Si—Ti) and silicon-cobalt (Si—Co) braze alloys and mixtures thereof. The exemplary melt alloy has good wetting and bonding of a SiC ceramic matrix composite material component to another SiC ceramic matrix composite material component with no excessive reactions between the melt alloy and the SiC ceramic matrix composite material components.

As another example, the silicon filler material that is consisting of a mixture of braze-alloys and high-melting materials, produces in-situ stable microstructure and phases, such as SiC, in the brazed joints at high-temperatures. CTE between the silicon braze filler composition and ceramic matrix composite component minimizes the joint thermal mismatch, which results in lower thermal residual stresses in the ceramic matrix composite braze joints, as another example.

As another example, the silicon filler material provides high-temperature joint mechanical properties. Tensile properties of double lap braze joints exceeded the ceramic matrix composite base material properties at room temperature, 2000° F., and 2100° F. The silicon filler material joints have high-temperature stability and cyclic oxidation resistance. As another example, the ceramic matrix composite melt alloy minimizes relative movements and leakages at the joint interfaces of ceramic matrix composite turbine vane assemblies as shown in FIG. 1.

TABLE 1

Ceramic Matrix Composite Melt Alloy Compositions (by weight percent)

| Alloy # | Alloy Name | Melting (° F.) | Al | Cr | Co | Ti | Ta |
|---|---|---|---|---|---|---|---|
| CMC-Bra-1 | 75Si—Ti | 2426 | 0.01 max | 0.01 max | 0.01 max | 24.3-25.3 | 0.01 max |
| CMC-Bra-2 | 91Ti—Si | 2426 | 0.01 max | 0.01 max | 0.01 max | 90.5-91.5 | 0.01 max |
| CMC-Bra-3 | 71Si—Cr | 2381 | 0.01 max | 28.5-29.5 | 0.01 max | 0.01 max | 0.01 max |
| CMC-Bra-4 | Ti—25Cr—23Si | 2381-2570 | 0.01 max | 24.5-25.1 | 0.01 max | 51.8-52.8 | 0.01 max |
| CMC-Bra-5 | 57Ti—Cr | 2570 | 0.01 max | 42.5-43.5 | 0.01 max | 56.5-57.5 | 0.01 max |
| CMC-Bra-6 | 12.5Si—Co | 2894 | 0.01 max | 0.01 max | 87.0-88.0 | 0.01 max | 0.01 max |
| CMC-Bra-7 | 98Nb—B | 2894 | 0.01 max | 0.01 max | 0.01 max | 0.01 max | 0.01 max |
| CMC-Bra-8 | 89Hf—Cr | 2732 | 0.01 max | 10.7-11.3 | 0.01 max | 0.01 max | 0.01 max |
| CMC-Bra-9 | 64Nb—Cr | 3002 | 0.01 max | 35.5-36.5 | 0.01 max | 0.01 max | 0.01 max |
| CMC-Bra-10 | 74Nb—Al | 2894 | 25.8-26.3 | 0.01 max | 0.01 max | 0.01 max | 0.01 max |
| CMC-Bra-11 | 74Ta—Al | 2901 | 25.8-26.3 | 0.01 max | 0.01 max | 0.01 max | 73.5-74.5 |
| CMC-Bra-12 | 53Ge—Nb | 2894 | 0.01 max | 0.01 max | 0.01 max | 0.01 max | 0.01 max |

| Alloy # | Nb | Hf | C | B | Si | Ge |
|---|---|---|---|---|---|---|
| CMC-Bra-1 | 0.01 max | 0.01 max | 3.01 max | 0.01 max | 74.7-75.7 | 0.01 max |
| CMC-Bra-2 | 0.01 max | 0.01 max | 3.01 max | 0.01 max | 8.5-9.5 | 0.01 max |
| CMC-Bra-3 | 0.01 max | 0.01 max | 3.01 max | 0.01 max | 70.5-71.5 | 0.01 max |
| CMC-Bra-4 | 0.01 max | 0.01 max | 3.01 max | 0.01 max | 22.4-23.4 | 0.01 max |
| CMC-Bra-5 | 0.01 max | 0.01 max | 3.01 max | 0.01 max | 0.01 max | 0.01 max |
| CMC-Bra-6 | 0.01 max | 0.01 max | 3.01 max | 0.01 max | 12.0-13.0 | 0.01 max |
| CMC-Bra-7 | 97.7-98.3 | 0.01 max | 3.01 max | 1.90-2.25 | 0.01 max | 0.01 max |
| CMC-Bra-8 | 0.01 max | 88.5-89.5 | 3.01 max | 0.01 max | 0.01 max | 0.01 max |
| CMC-Bra-9 | 63.5-64.5 | 0.01 max | 3.01 max | 0.01 max | 0.01 max | 0.01 max |
| CMC-Bra-10 | 73.5-74.5 | 0.01 max | 3.01 max | 0.01 max | 0.01 max | 0.01 max |
| CMC-Bra-11 | 0.01 max | 0.01 max | 3.01 max | 0.01 max | 0.01 max | 0.01 max |
| CMC-Bra-12 | 46.5-47.5 | 0.01 max | 3.01 max | 0.01 max | 0.01 max | 52.5-53.5 |

TABLE 2

Ceramic Matrix Composite Melt Alloy Mixtures (by weight percent)

| Braze Mixture # | Braze mixture (wt %) | Comments |
| --- | --- | --- |
| BrazMix-1 | Co-377 (95%) + Ti—9Si (5%) | CMC cracks, braze melt but not wet-out. |
| BrazMix-2 | Co-377 (96%) + TiH (4%) | Braze melt, joint cracks, interface reacted |
| BrazMix-3 | Co-472 (96%) + TiH (4%) | Melt, good flow, bonded, large voids, joint cracks, interface reactions |
| BrazMix-4 | Co-472 (95%) + 12.5Si—Co (5%) | Braze melt, not good flow, bonded, no cracks |
| BrazMix-5 | 71Si—Cr (100%) | Braze melt, good flow, no cracks |
| BrazMix-6 | 71Si—Cr (95%) + Ti—9Si (5%) | Braze melt, good flow, no cracks, cyclic oxidation test at 2000 F./RT, SEM |
| BrazMix-7 | 75Si—Ti (100%) | Good flow, no cracks, cyclic test at 2000 F./RT no fracture in braze at 100 cycles |
| BrazMix-8 | 75Si—Ti (97%) + C (3%) | Good bond, cyclic test at 2000 F./RT no fracture in braze at 100 cycles, tensile tests |
| BrazMix-9 | 75Si—Ti (97%) + B (3%) | Not good flow, unbonded |
| BrazMix-10 | 75Si—Ti (50%) + 71Si—Cr (50%) | Good flow, bonded |
| BrazMix-11 | 75Si—Ti (50%) + Ti—43Cr (50%) | Good flow, bonded |
| BrazMix-12 | 75Si—Ti (50%) + 12.5Si—Co (50%) | Good flow, bonded |
| BrazMix-13 | Ti—25Cr—23Si (100%) | Good flow, bonded |
| BrazMix-14 | Ti—25Cr—23Si (97%) + C (3%) | Good flow, bonded, cyclic test at 2000 F./RT after 100 clycles of cyclic oxidation test |

In some embodiments, the melt alloy 24 comprises one or more high temperature melting alloys. In some embodiments, the melt alloy 24 is a braze alloy that has a melting point of about 1300° C. to 1650° C. In some embodiments, the melt alloy 24 is a crystalline solid. In some embodiments, the melt alloy 24 has a nominal composition comprising, in weight percent, up to about 75 percent silicon, up to about 25 percent aluminum, or up to about 91 percent titanium.

In some embodiments, the melt alloy 24 includes a braze alloy mixture for brazing ceramic matrix composite substrates. In some embodiments, the melt alloy 24 is a eutectic mixture. In some embodiments, the melt alloy 24 includes a base metal. In some embodiments, the melt alloy 24 includes a base intermetallic element.

In some embodiments, the melt alloy 24 includes at least one secondary metal different from the base metal and/or element. In some embodiments, the melt alloy 24 includes at least one secondary element different from the base metal and/or element.

In some embodiments, the melt alloy 24 has a baseline braze alloy composition of silicon and titanium. In some embodiments, the melt alloy 24 has a baseline braze alloy composition of about 75 percent silicon by weight, 25 percent titanium by weight. In some embodiments, the melt alloy 24 has an eutectic melting temperature of 1330° C. In some embodiments, the melt alloy 24 has a baseline braze alloy composition of silicon, titanium, and at least one of aluminum, boron, and chromium. The aluminum, boron, and/or chromium improve joint re-melt temperatures and mechanical properties. In some embodiments, the melt alloy 24 has a composition including silicon, titanium, and an element selected from the group consisting of carbon, boron, tantalum, niobium, and hafnium.

As an example of the melt alloy 24 in use, a vane assembly 10 of a gas turbine engine is shown in FIG. 1. The vane assembly 10 includes an airfoil 14, a first platform 12, and a second platform 16. In the illustrative embodiment, the airfoil 14, the first platform 12, and the second platform 16 are made of a ceramic matrix composite material.

The airfoil 14 includes a first end 30 and a second end 32 spaced apart from and opposite the first end 30. The first platform 12 includes a first airfoil slot 18A sized to receive the first end 30 of the airfoil 14. The second platform 16 includes a second airfoil slot 18B sized to receive the second end 32 of the airfoil 14.

To produce the vane assembly 10, the first end 30 of the airfoil 14 is received in the first airfoil slot 18A and the second end 32 of the airfoil 14 is received in the second airfoil slot 18B. The melt alloy 24 is applied to the first end 30, the first airfoil slot 18A, and the first platform 12 proximate the first end 30. The melt alloy 24 is applied to the second end 32, the second airfoil slot 18B, and the second platform 16 proximate the second end 32. In some embodiments, the melt alloy 24 may be applied before the first end 30 and/or the second end 32 is received in the first and second airfoil slots 18A, 18B respectively. The vane assembly 10 is heat treated and then cooled. After cooling, the airfoil 14 is coupled to the first and second platforms 12, 16.

As an example of a method of using the melt alloy 24, the melt alloy 24 is applied to a first component, for example, the airfoil 14, and a second component, for example, the first platform 12. In some embodiments, both components are made of a ceramic matrix composite material. In some embodiments, one of the components is made from a metal material. The melt alloy 24 coated components are heat treated to a temperature sufficient to induce at least a portion of the braze composition to melt. In some embodiments, the temperature is 2475° F. The components and the melt alloy 24 are maintained at the temperature for a length of time. Thereafter, components and the melt alloy 24 are cooled. In some embodiments, the temperature is selected to be at least about 2400° F. yet lower than a melting point temperature of any of the ceramic matrix composite components.

In some embodiments, the components are subjected to a diffusion heat treatment. The components are heat treated at a temperature suitable for diffusion. In some embodiments, the temperature is about 2000° F. to 2400° F.

An example of an assembly used to test a ceramic matrix composite brazed joint is shown in FIGS. 4-6. The test assembly 20, shown in FIG. 4, includes a first component 22, a second component 26, melt alloy 24, a first reinforcement strip 23, and a second reinforcement strip 25. The first component 22 includes a top surface 40 and a bottom surface 42 spaced apart and opposite top surface 40. The second component 26 includes a top surface 44 and a bottom surface 46 spaced apart from and opposite the top surface 44.

As shown in FIGS. 5 and 6, the first component 22 and the second component 26 lie in the same plane and are spaced apart from each other. The melt alloy 24 is applied between the first and second components 22, 26 along a width of the first and the second components 22, 26. The melt alloy 24 is additionally applied to top surfaces 40, 44 and bottom surfaces 42, 46 of the first and second components 22, 26 respectively. The first reinforcement strip 23 is positioned on the melt alloy 24 that is applied to the top surfaces 40, 44. The second reinforcement strip 25 is positioned on the melt alloy 24 that is applied to the bottom surfaces 42, 46. As such, the test assembly 20 has a double-lap joint. In some embodiments, the test assembly 20 has a single-lap joint. The test assembly 20 is heat treated and cooled to braze the melt alloy 24 to the first component 22, the second component 26, the first reinforcement strip 23, and the second reinforcing strip 25.

The tensile strength of the test assembly 20 was then tested. To test the tensile strength, the first and second components 22, 26 were pulled in the opposite direction perpendicular to the reinforcement strips 23, 25. The tests were performed at least at room temperature, 2000° F., and 2100° F. For each test, the test assembly failed in either the first or second components 22, 26 at break point 27, but not in the melt alloy 24. All the ceramic matrix composite tensile specimens, like test assembly 20, failed in the ceramic matrix composite base materials outside of the braze joints. The tensile properties of the double-lap braze joints exceeded the ceramic matrix composite base material properties at room temperature, 2000° F., and 2100° F.

The resistance of the joints of the test assembly 20 was tested for thermal shock and oxidation using cyclic oxidation tests between room temperature and 2000° F. The joints of the test assembly 20 survived after 100 cycles, wherein the temperature was held at 2000° F. for 1 hour per cycle.

Figure 7:
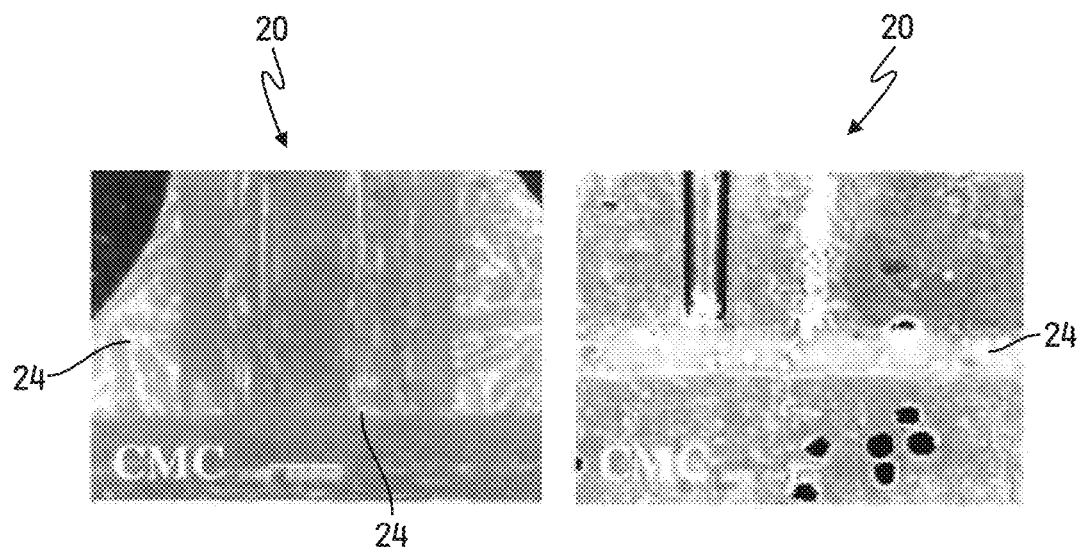
FIG. 7 is an enlarged front view of a third test assembly used to test the melt alloy by cycling, for one hundred cycles, between room temperature and 2000° F. and holding the temperature at 2000° F. for one hour, the third test assembly including a first component made of ceramic matrix composite material joined to a second components made of ceramic matrix composite material by the melt alloy, and showing the microstructure of the pre-tested melt alloy joint.
Figure 8:
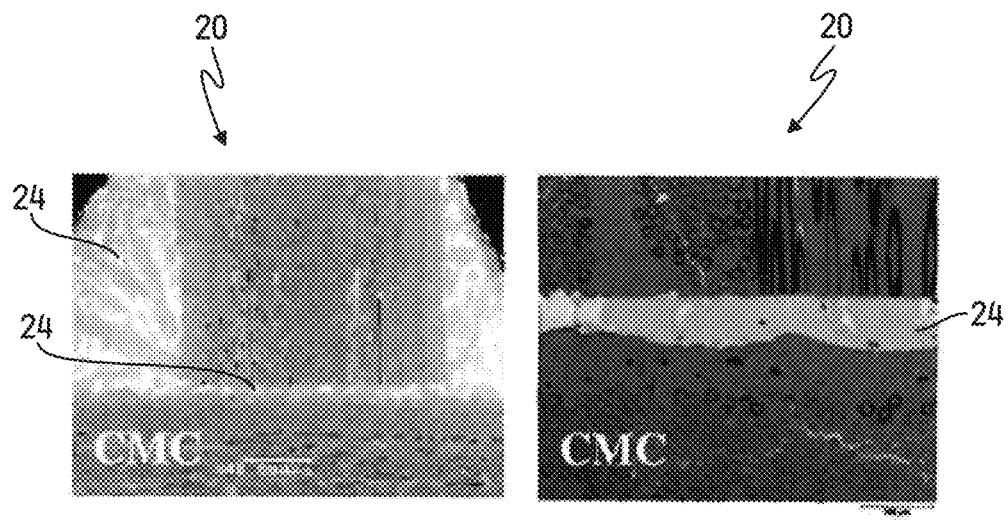
FIG. 8 is an enlarged front view of the third test assembly used to test the melt alloy by cycling, for one hundred cycles, between room temperature and 2000° F. and holding the temperature at 2000° F. for one hour, and showing the microstructure of the post-tested melt alloy joint.

FIG. 7 shows as-brazed CMC joints. Brazed CMC joints after 100 cycles (hours) of 2000° F./RT Thermal Shock/Cyclic Oxidation tests are shown in FIG. 8. The microstructure of the brazed joints of the test assembly 20 was evaluated using a Scanning Electron Microscope (SEM) before testing and after the cycle oxidation tested conditions described above. The pre-test microstructure of the test assembly 20 is shown in FIG. 7. The post-test microstructure of the test assembly 20 is shown in FIG. 8. The tests revealed that the pre-test and post-test microstructure and strength were similar.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A melt alloy for use as a braze material for joining ceramic matrix composites, the melt alloy comprising:
   a homogeneous mixture of two or more materials in powder form, one of the two or more materials being a braze alloy comprising silicon and another of the two or more materials being a high melting point material or alloy,
   wherein the homogeneous mixture of the two or more materials in powder form is selected from the group consisting of (in wt. %): Ti-9Si (5%)+71Si—Cr (95%), 75Si—Ti (97%)+C (3%), 75Si—Ti (97%)+B (3%), 75Si—Ti (50%)+71Si—Cr (50%), 75Si—Ti (50%)+Ti-43Cr (50%), 75Si—Ti (50%)+12.5Si—Co (50%), and Ti-25Cr-23Si (97%)+C (3%).

2. The melt alloy of claim 1, wherein the braze alloy comprising silicon further comprises titanium.

3. The melt alloy of claim 1, wherein the braze alloy comprising silicon further comprises chromium.

4. The melt alloy of claim 1, wherein the braze alloy includes up to about 75 wt. % Si.

5. The melt alloy of claim 4, wherein the braze alloy is selected from the group consisting of (in wt. %): Ti-9Si, Ti-25Cr-23Si, 71Si—Cr, and 75Si—Ti.

6. The melt alloy of claim 1, wherein the high melting point material is selected from the group consisting of C, B and TiH.

7. The melt alloy of claim 1, wherein the high melting point material is an alloy including at least one of silicon, titanium, chromium and cobalt.

8. The melt alloy of claim 1, wherein the mixture includes from 50 wt. % to 97 wt. % of the braze alloy, and from 3 wt. % to 50 wt. % of the high melting point material.

9. A method of coupling two ceramic matrix composite components, the method comprising the operations of:
   procuring a first ceramic matrix composite component;
   procuring a second ceramic matrix composite component;
   applying a melt alloy between the first and second ceramic matrix components, the melt alloy comprising a homogeneous mixture of two or more materials in powder form, where the two or more materials in powder form include a braze alloy comprising silicon and a high melting point material or alloy, the braze alloy including up to about 75 wt. % Si and being selected from the group consisting of (in wt. %): Ti-9Si, Ti-25Cr-23Si, 71Si—Cr, and 75Si—Ti;
   heat treating the first ceramic matrix composite component, the second ceramic matrix composite component, and the melt alloy to a temperature;
   maintaining the temperature for a length of time; and
   cooling the first ceramic matrix composite component, the second ceramic matrix composite component, and the melt alloy,
   thereby coupling the first and second ceramic matrix composite components.

10. The method of claim 9, wherein the braze alloy further comprises titanium.

11. The method of claim 9, wherein the braze alloy further comprises chromium.

12. The method of claim 9, wherein the high melting point material is selected from the group consisting of C, B and TiH.

13. The method of claim 9, wherein the high melting point material is an alloy including at least one of silicon, titanium, chromium and cobalt.

14. The method of claim 9, wherein the mixture includes from 50 wt. % to 97 wt. % of the braze alloy, and from 3 wt. % to 50 wt. % of the high melting point material.

15. The method of claim 9, wherein the homogeneous mixture of the two or more materials in powder form is selected from the group consisting of (in wt. %): Ti-9Si (5%)+71Si—Cr (95%), 75Si—Ti (97%)+C (3%), 75Si—Ti (97%)+B (3%), 75Si—Ti (50%)+71Si—Cr (50%), 75Si—Ti (50%)+Ti-43Cr (50%), 75Si—Ti (50%)+12.5Si—Co (50%), and Ti-25Cr-23Si (97%)+C (3%).

16. A method of coupling two ceramic matrix composite components, the method comprising the operations of:
   procuring a first ceramic matrix composite component;
   procuring a second ceramic matrix composite component;
   applying a melt alloy between the first and second ceramic matrix components, the melt alloy comprising a homogeneous mixture of two or more materials in powder form, where the two or more materials in powder form include a braze alloy comprising silicon and a high melting point material or alloy;

heat treating the first ceramic matrix composite component, the second ceramic matrix composite component, and the melt alloy to a temperature;

maintaining the temperature for a length of time; and cooling the first ceramic matrix composite component, the second ceramic matrix composite component, and the melt alloy, thereby coupling the first and second ceramic matrix composite components, wherein the homogeneous mixture of the two or more materials in powder form is selected from the group consisting of (in wt. %): Ti-9Si (5%)+71Si—Cr (95%), 75Si—Ti (97%)+C (3%), 75Si—Ti (97%)+B (3%), 75Si—Ti (50%)+71Si—Cr (50%), 75Si—Ti (50%)+Ti-43Cr (50%), 75Si—Ti (50%)+12.5Si—Co (50%), and Ti-25Cr-23Si (97%)+C (3%).

17. A method of coupling two ceramic matrix composite components, the method comprising the operations of:

procuring a first ceramic matrix composite component;

procuring a second ceramic matrix composite component;

applying a melt alloy between the first and second ceramic matrix components, the melt alloy comprising a homogeneous mixture of two or more materials in powder form, where the two or more materials in powder form include a braze alloy comprising silicon and a high melting point material selected from the group consisting of C, B and TiH;

heat treating the first ceramic matrix composite component, the second ceramic matrix composite component, and the melt alloy to a temperature;

maintaining the temperature for a length of time; and cooling the first ceramic matrix composite component, the second ceramic matrix composite component, and the melt alloy, thereby coupling the first and second ceramic matrix composite components.

* * * * *